United States Patent [19]
Gilbert

[11] 4,239,105
[45] Dec. 16, 1980

[54] RESIN CAPSULE FOR MINING ROOF BOLTING SYSTEMS

[75] Inventor: Peter T. Gilbert, Albany, N.Y.

[73] Assignee: General Electric Company, Gainesville, Fla.

[21] Appl. No.: 62,968

[22] Filed: Aug. 2, 1979

[51] Int. Cl.³ .................... B65D 81/32; B65D 25/08
[52] U.S. Cl. .................................. 206/219; 206/568; 405/256
[58] Field of Search ................. 206/219, 568; 405/256

[56] References Cited

U.S. PATENT DOCUMENTS

| | | | |
|---|---|---|---|
| 3,756,388 | 9/1973 | Murphy | 206/219 |
| 3,861,522 | 1/1975 | Llewellyn et al. | 206/219 |
| 4,007,831 | 2/1977 | Bernhardt | 206/219 |

*Primary Examiner*—William T. Dixson, Jr.

[57] ABSTRACT

A multi-compartment capsule having a longitudinally extending tubular inner compartment for containing a catalyst and a longitudinally extending tubular outer compartment around the inner compartment for containing a resin composition. The longitudinally extending tubular inner and outer compartments are formed by a single-ply film strip of polyester material to which are welded along opposite longitudinal edges two-ply strips having a first ply of polyester material welded to the polyester film strip of the single-ply strip and a second ply of polyethylene material. The composite sheet made up of the single-ply strip and two-ply strips is folded upon itself along one two-ply marginal edge to form the tubular inner compartment so that the polyethylene ply material at the composite strip edge contacts such ply material when folded and is welded thereto. The opposite two-ply marginal edge of the composite strip is then folded over the formed inner compartment so as to bring the polyethylene ply material at the edge into contact with the polyethylene ply material of the other edge and is welded thereto to form the tubular outer compartment.

5 Claims, 3 Drawing Figures

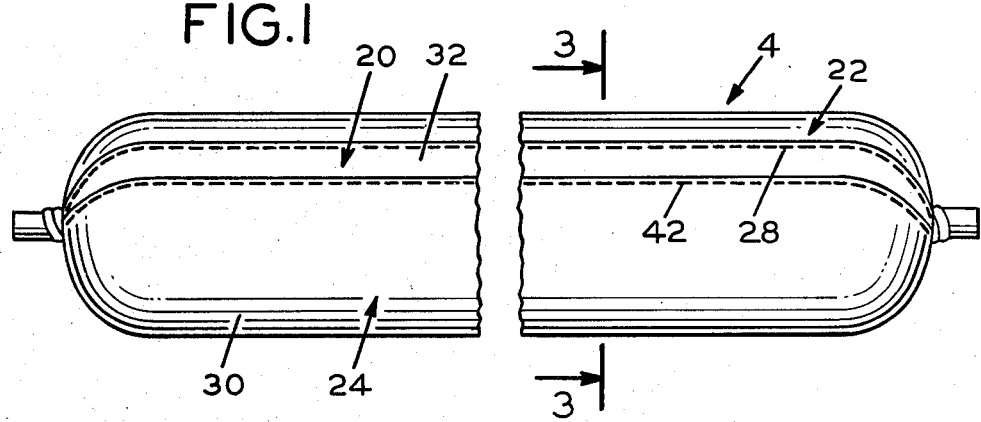
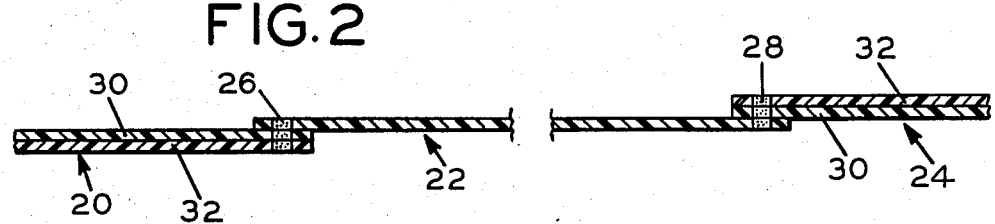
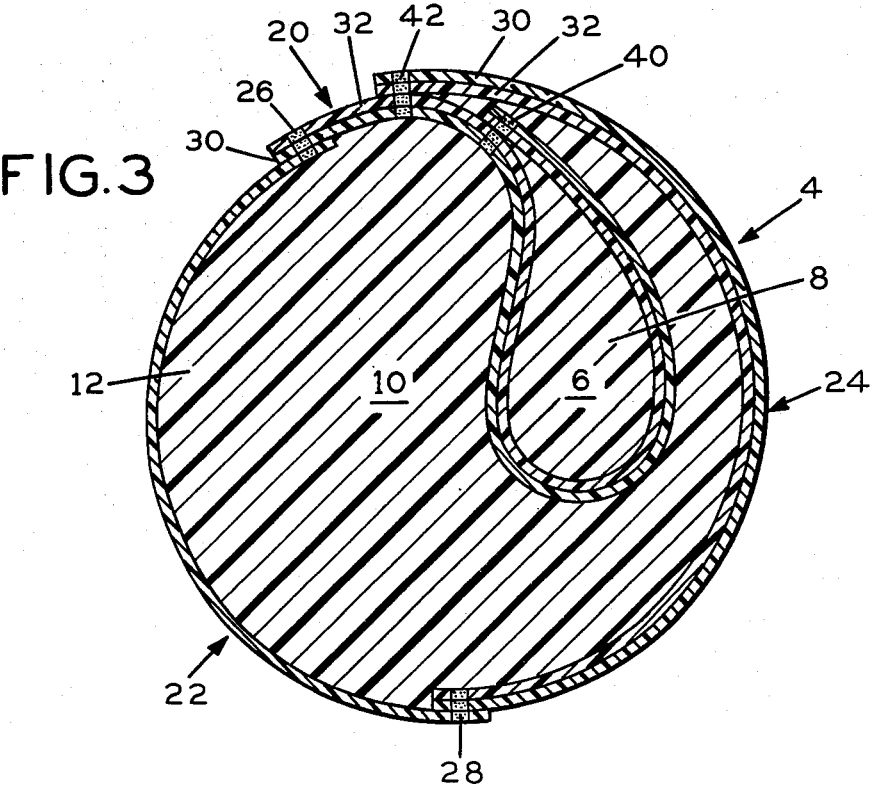

RESIN CAPSULE FOR MINING ROOF BOLTING SYSTEMS

This invention relates to a multi-compartment capsule and, more specifically, to a multi-compartmented capsule particularly adapted for mining roof bolting systems.

It has become common practice in mining to reinforce or stabilize mine roofs by drilling or boring a hole into the rock strata at the roof of the mine, inserting a resin capsule into the drilled hole and then inserting a specially designed bolt through the capsule into the hole. One compartment in the capsule contains a resin and the other compartment contains a catalyst or hardening agent for the resin. The bolt, as it is inserted, ruptures the capsule and the capsule compartments. The bolt is turned and distributes and mixes the catalyst or hardener with the resin. This causes the resin to cure and harden around the bolt in the drilled or bored hole and in the cracks and voids in the rock structure contiguous thereto. The cured and hardened resin and bolt reinforce and strengthen the mine roof. This is, of course, critical to the safety of the mine and the surface above.

There are a number of resin systems which are useful in mining roof bolting systems. Such resins include epoxies, polyurethanes and polyesters. Typical of useful resins are the so-called unsaturated polyester resins prepared by esterification of a mixture of ingredients including a polyhydric alcohol and an unsaturated polycarboxylic acid combined as desired with crosslinking monomers typified by vinyl monomers, such as, styrene and vinyl toluene, along with various fillers, flow modifiers, thixotropic agents, flame retardant materials, plasticizers and initiators or curing agents which are typically of the well known peroxide type.

A typical resin useful in connection with mining roof bolting systems and for which the container of the instant invention is suited consists of a 65–35 by weight mixture of fumaric acid and phthalic anhydride, esterified with propylene glycol and cut to 70 percent polyester by weight with a 50—50 by weight blend of styrene and vinyl toluene. There is added to this basic resin mixture a cure accelerator and filler such as limestone, dolomite or other mineral filler to the extent of about 73 percent by weight. These parameters can be varied to suit particular conditions. Typically, the curing or hardening agent comprises benzoyl peroxide used in suitable curing quantities and is kept separated from the basic mixture until reaction, setting and hardened is desired.

The handling, packaging and storing of the resin mixture and the curing or hardening agent, the handling of the packaged unit, the introduction of the packaged resin mixture and curing or hardening agent into a drilled or bored hole in a mine roof and the blending and mixing of the resin and curing agent in the hole when the bolt is inserted, present interesting problems. On the one hand, the resin mixture and the curing and hardening agent must be packaged so that they will withstand handling and extended periods of storage without deterioration or reaction with each other or deterioration or reaction from the atmosphere. On the other hand, such mixture and agent must also be packaged so that, when in place in a drilled or bored mining roof hole, the roof bolt has been inserted and the bolt turned, the package and packaging materials will not inhibit or interfere with the mixing, blending and curing or hardening of the resin. Furthermore, the packaging materials and packaging configuration must be such that the package is inexpensive to provide, easy to fill, will occupy minimum of space within the roof hole and will not interfere with the reaction of the resin with the agent or the hardening of the resin around the bolt in the hole and in the rock cracks and voids contiguous thereto.

One method and apparatus found to be particularly suited for inexpensive packaging of resin and a curing and hardening agent for use in mining roof bolting systems is shown and described in U.S. Pat. No. 4,009,778, dated Mar. 1, 1977. In the arrangement of such patent, a strip of thermoplastic sheet material is shaped into a tube, having a smaller tube therein, by folding and rolling one longitudinal edge of the strip into a longitudinally extending smaller tube and by then rolling the other longitudinal edge over the fold and the one longitudinal edge to form a larger tube around the small tube. The longitudinal edges and the sheet along the line where the one longitudinal edge is folded or rolled back are then heat sealed to form a continuous, two compartment tube. The smaller diameter inner tube is filled with the catalyst or hardening agent and the larger, outer tube is filled with the resin just after the edges and sheet are heat sealed. The filled container is then formed into units or capsules, by gathering and cutting the ends at fixed lengths with clips or wires.

One material which has been found to be particularly suited for use in forming two compartment capsules of the type formed by the apparatus of the 4,009,778 patent is laminated film, such as, polyethylene terephthalate film, or Mylar laminated on both sides with polyethylene. Such film is impervious to vapor and, therefore, is ideal for maintaining the freshness of the resin and the catalyst or hardening agent. Leakage of vapor from the atmosphere into the capsule and out of the capsule into the atmosphere is prevented. Such film material is also inert to the resin and the catalyst and is of sufficient strength and toughness to withstand handling and storage. The polyethylene outer surface is thermoplastic and provides a surface readily adaptable to heat sealing or welding as in the apparatus of the 4,009,778 patent.

The polyester film of the laminate tends to limit the stretch of the polyethylene film. Conversely, the polyethylene film of the laminate tends to off-set the brittleness of the polyester film. Thus, when laminated together, the polyethylene film and polyester film have combined properties which the individual films, standing alone, do not possess. However, except for the heat seal which it provides, the lamination of the polyethylene film on the two sides of the polyester film provides little more than a laminate on one side. Furthermore, the laminating of the polyethylene film on the two sides of the polyester film is substantially more expensive than the lamination on the one side. Lamination on the one side is, of course, more expensive than unlaminated film.

In the instant invention it has been discovered that unlaminated polyester film and polyester film laminated on one side with polyethylene film can be combined to produce a multi-compartmented capsule for the resin and the catalyst components of a mine bolt system. It has been further discovered that such capsule can be formed, filled and sealed on conventional apparatus, such as the apparatus shown and described in the 4,009,778 patent.

In the practice of the invention of the present application, strips of two-ply material, one ply, for example, being of polyester film and the other ply of polyethylene film, are overlapped along one edge with the opposite marginal edges of a single-ply strip of polyester film. The strips are overlapped so that the polyester ply surface of the two-ply strips at such overlap face and contact the surface of the single-ply polyester film strip. The contacting polyester film strip surfaces are then bonded or welded together such as with an ultra-sonic bonding unit similar to the unit employed in U.S. patent application Ser. No. 040,217, filed May 18, 1979. With such an ultra-sonic unit, the contacting surface can be heated and be welded or fused together without damage to the polyethylene ply of the two-ply strips. For reasons more apparent later herein, the two-ply strips are overlapped and heat sealed or welded to the marginal edges of the polyester strip with one two-ply strip heat sealed or welded to one surface of the polyester strip at one marginal edge and with the other two-ply strip heat sealed or welded to the opposite surface of the polyester strip at the other marginal edge. Subsequent to such heat sealing or welding, the overlapped and heat sealed or welded strips, which now form a composite sheet, are folded, formed into the smaller, inner tubular container and larger, outer tubular container, heat sealed or welded and the inner and outer tubular containers are filled with the catalyst and the resin, respectively, all on conventional apparatus, such as the apparatus of the 4,009,778 patent.

The two-ply portion along one marginal edge of the composite sheet is folded over upon itself to form the smaller inner tubular container so that the polyethylene ply at the edge of the composite strip is brought back into contact with the polyethylene surface and is heat sealed or welded to such surface to form a longitudinally extending seam or weld. The two-ply portion along the other marginal edge of the composite sheet is then folded or rolled over the smaller inner tubular container so that the polyethylene ply surface at such marginal edge contacts the polyethylene ply surface of the other two-ply portion and the two surfaces are heated and sealed or welded together to form a longitudinally extending seam or weld substantially parallel to the first seam or weld. Because the material of the thermoplastic or polyethylene ply melts, softens and becomes tacky at a temperature lower than the temperature of the polyester ply material, such heat seaming or welding to form the smaller inner tubular container and the larger outer tubular container without harm or damage to the polyester material. Because the polyester film material of the single ply portion of the container tends to be brittle and the polyester-polyethylene two-ply material tends to be more resilient, when filled, respectively, with resin and catalyst, the single-ply polyester resin container tends to rupture first when the container is placed in a drilled hole and a roof bolt is inserted. The more resilient two-ply catalyst container tends to rupture later when the roof bolt is rotated. Thus, the resin tends to flow into the cracks, crevices and voids surrounding the drilled hole and to penetrate before the catalyst container ruptures and the catalyst is distributed in the resin to set and harden such resin.

The invention of the instant application will be more fully described and better understood from the following description, taken with the appended drawings, of the preferred embodiment of the instant invention in which FIG. 1 is a side elevation view of the multi-compartment capsule of the invention;

FIG. 2 is a sectional view of the composite strip employed in the instant invention; and FIG. 3 is a sectioned, enlarged view, taken at 3—3, FIG. 1.

Referring to the drawings, the capsule, generally designated 4, includes an inner tubular compartment 6 filled with catalyst or hardening agent 8, such as benzoyl peroxide, and an outer, larger tubular compartment 10 filled with resin 12, such as fumaric acid and phthalic anhydride, esterified with propylene glycol and cut with a blend of styrene and vinyl toluene to which cure accelerator and mineral filler have been added. The walls of inner tube 6, outer tube 10 and, hence, capsule 4, are made up of three strips, generally designated 20, 22, 24, overlapped at their marginal edges and joined by heat seals or welds at 26, 28. The strips may be overlapped and joined by heat sealing and welding at 26, 28 before the joined strips are fed to the forming and filling apparatus or as the strips are fed to such apparatus.

As best shown in FIGS. 2 and 3, center strip 22 is of single-ply material, such as polyester or polyethylene terephthalate film or Mylar. Strips 20, 24 are of two-ply material, one-ply 30 being of the same material, such as polyester, as center strip 22, and the other ply 32 being of a thermoplastic material such as polyethylene. Strips 20, 24 are reversed and heat sealed or welded to the opposite marginal edges of center strip 22 so that the polyester laminate of strips 20, 24 are heat sealed or welded to the polyester film of single-ply center strip 22.

As best shown in FIG. 3, double-ply strip 22 is double folded upon itself so that thermoplastic ply 32 at the end of the strip is brought back into contact with ply 32 and is heat sealed or welded thereto at 40 to from inner tubular container 6. After inner container 6 is formed, the free edge of two-ply portion 24 is folded around inner container 6 and the edge portion of thermoplastic inner ply 32 is brought into contact with thermoplastic inner ply 32 of two-ply portion 20 and is heat sealed or welded thereto, at 42, to form outer tubular container 10 around inner container 6. Inner container 6 and outer container 10 are then filled with catalyst and resin, respectively.

The width of single-ply strip 22 and the width of two-ply strips 20, 24 overlapped and heat sealed or welded along the overlapping edge to each other and forming the flat sheet from which capsule 4 and the inner and outer tubular containers are formed by the folding, lapping and heat sealing thereof, will of course depend upon the circumference of the capsule 4 and the inner catalyst tubular container 6 to be formed therewith. The width of two-ply strip 20 should be such that strip 20 might be folded and heat sealed or welded to itself to form inner container 6 leaving exposed sufficient area of outer, thermoplastic ply 32 so that the inner thermoplastic ply 32 of two-ply strip 24 might be heat sealed or welded thereto. Two-ply strip 24 need only be wide enough for overlapping and ultra-sonic welding to the marginal edge of single-ply strip 22 and for contacting and heat sealing or welding to outer ply 32 of two-ply strip 20.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A multi-compartment capsule having a longitudinally extending tubular inner compartment for containing a catalyst and a longitudinally extending tubular outer campartment around said inner compartment for containing a resin composition which, when mixed and reacted with said catalyst sets and becomes a hardened mass, said capsule being formed of a composite strip having a single-ply longitudinally extending center portion with two-ply portions extending longitudinally along and heat sealed to the opposite longitudinal marginal edges of said center portions, one of said two-ply edge portions being folded back upon itself and being heat sealed to form the longitudinally extending inner compartment, the longitudinal outer edge of the other of said two-ply film strips being folded around said longitudinally extending inner compartment and being heat sealed to the outer ply of said one two-ply strip to form said outer compartment around said inner compartment.

2. A multi-compartment capsule, as recited in claim 1 in which the longitudinal opposite edges of said two-ply edge portions are overlapped by and welded to said opposite surfaces of said single-ply center portion adjacent to the opposite marginal edges of said single-ply center portion.

3. A multi-compartment capsule, as recited in claims 1 or 2, in which said single ply center portion and one of the plies of said two-ply edge portions are of polyester material and the other ply of said two-ply edge portions are of polyethylene material.

4. A multi-compartment capsule, as recited in claims 1 or 2, in which the single ply center portion and one of the plies of said two-ply edge portions are of polyester material and the other ply of said two-ply edge portions are of polyethylene material.

5. A multi-compartment capsule, as recited in claim 4, in which said outer two-ply edge portions are folded so that said plies of polyethylene material are abutted and heat sealed.

* * * * *

UNITED STATES PATENT AND TRADEMARK OFFICE
CERTIFICATE OF CORRECTION

PATENT NO. : 4,239,105
DATED : December 16, 1980
INVENTOR(S) : Peter T. Gilbert

It is certified that error appears in the above—identified patent and that said Letters Patent is hereby corrected as shown below:

In the heading of the patent under [73] Assignee:

Cancel "Gainesville, Florida" and substitute --Schenectady, New York--

Signed and Sealed this

Fourteenth Day of April 1981

[SEAL]

*Attest:*

RENE D. TEGTMEYER

*Attesting Officer*     *Acting Commissioner of Patents and Trademarks*